(12) United States Patent
Lee et al.

(10) Patent No.: US 11,895,703 B2
(45) Date of Patent: Feb. 6, 2024

(54) METHOD AND APPARATUS FOR SELECTING PSSCH RESOURCE IN NR V2X

(71) Applicant: LG Electronics Inc., Seoul (KR)

(72) Inventors: Jongyoul Lee, Seoul (KR); Hanbyul Seo, Seoul (KR); Seungmin Lee, Seoul (KR); Hyukjin Chae, Seoul (KR); Uihyun Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 255 days.

(21) Appl. No.: 17/422,345

(22) PCT Filed: Jan. 10, 2020

(86) PCT No.: PCT/KR2020/000471
§ 371 (c)(1),
(2) Date: Jul. 12, 2021

(87) PCT Pub. No.: WO2020/145723
PCT Pub. Date: Jul. 16, 2020

(65) Prior Publication Data
US 2022/0116996 A1     Apr. 14, 2022

Related U.S. Application Data

(60) Provisional application No. 62/791,705, filed on Jan. 11, 2019.

(51) Int. Cl.
*H04W 74/08*     (2009.01)
*H04W 74/00*     (2009.01)
(Continued)

(52) U.S. Cl.
CPC ..... *H04W 74/0816* (2013.01); *H04W 74/002* (2013.01); *H04W 28/26* (2013.01); *H04W 72/40* (2023.01)

(58) Field of Classification Search
CPC ......... H04W 74/0808; H04W 74/0816; H04W 74/00; H04W 74/002; H04W 2027/0018;
(Continued)

(56) References Cited

U.S. PATENT DOCUMENTS

2020/0196255 A1* 6/2020 Cheng ................... H04L 5/0064
2020/0205165 A1* 6/2020 Huang .................. H04L 1/1854
(Continued)

OTHER PUBLICATIONS

Huawei, HiSilicon, "Sidelink CSI," R1-1813553, 3GPP TSG RAN WG1 Meeting #95, Spokane, USA, dated Nov. 12-16, 2018, 8 pages.
(Continued)

*Primary Examiner* — Warner Wong
(74) *Attorney, Agent, or Firm* — Fish & Richardson P.C.

(57) ABSTRACT

Provided are a method by which a first device performs wireless communication and an apparatus for supporting same. The method may comprise the steps of: determining a first PSSCH resource selected by a second device; selecting a second PSSCH resource; and transmitting a PSSCH by using the second PSSCH resource. Here, a PSFCH resource related to the second PSSCH resource may not overlap a PSFCH resource related to the first PSSCH resource.

7 Claims, 24 Drawing Sheets

(51) Int. Cl.
*H04W 28/26* (2009.01)
*H04W 72/40* (2023.01)

(58) Field of Classification Search
CPC ........... H04W 2027/002; H04W 28/00; H04W 28/26; H04W 72/00; H04W 72/02; H04W 72/0446; H04W 72/0453; H04W 72/40; H04W 72/50; H04L 1/0073; H04L 1/1867; H04L 1/1893; H04L 47/12; H04L 47/26; H04L 47/722
See application file for complete search history.

(56) References Cited

U.S. PATENT DOCUMENTS

| | | | | |
|---|---|---|---|---|
| 2020/0220669 | A1* | 7/2020 | Park | H04L 1/1864 |
| 2020/0359375 | A1* | 11/2020 | Hwang | H04L 1/1854 |
| 2021/0266922 | A1* | 8/2021 | Zhao | H04W 72/56 |
| 2021/0314921 | A1* | 10/2021 | Yang | H04L 1/1864 |
| 2021/0351896 | A1* | 11/2021 | Kim | H04L 1/1887 |
| 2022/0015067 | A1* | 1/2022 | Li | H04L 5/0055 |
| 2022/0085921 | A1* | 3/2022 | Zhang | H04L 1/1854 |
| 2022/0345277 | A1* | 10/2022 | Ryu | H04L 1/08 |

OTHER PUBLICATIONS

Kyocera, "A Reliable Groupcast HARQ feedback scheme for NR V2X," R1-1900084, 3GPP TSG-RAN WG1-AH-1901, Taipei, Taiwan, dated Jan. 21-25, 2019, 5 pages.
LG Electronics, "Discussion on physical layer structure for NR V2X," R1-1813860, 3GPP TSG RAN WG1 Meeting #95, Spokane, USA, dated Nov. 12-16, 2018, 10 pages.
Qualcomm Incorporated, "Considerations on Physical Layer aspects of NR V2X," R1-1813421, 3GPP TSG RAN WG1 Meeting #95, Spokane, USA, dated Nov. 12-16, 2018, 18 pages.
Samsung, "Discussion on physical layer structures for NR V2X," R1-1812984, 3GPP TSG RAN WG1 #95, Spokane, USA, dated Nov. 12-16, 2018, 12 pages.

* cited by examiner

FIG. 4
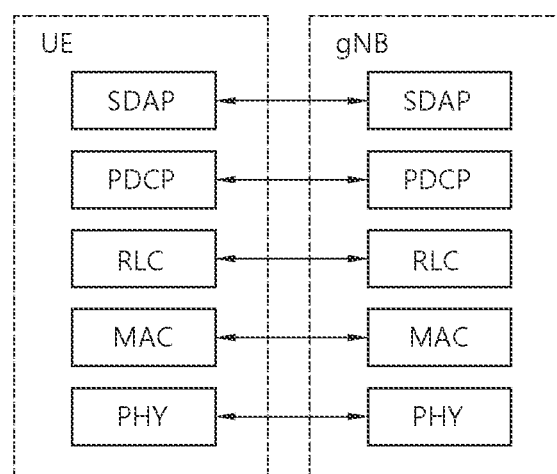
(a)
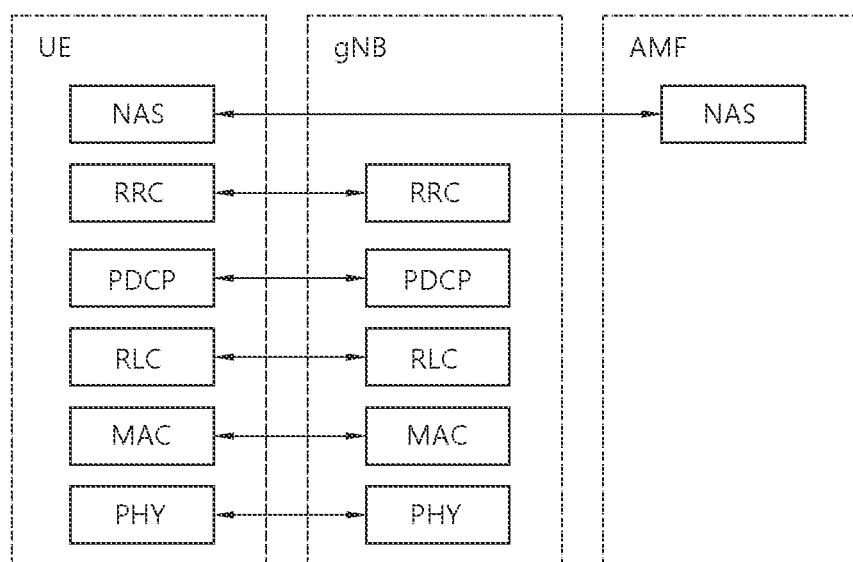
(b)

FIG. 8
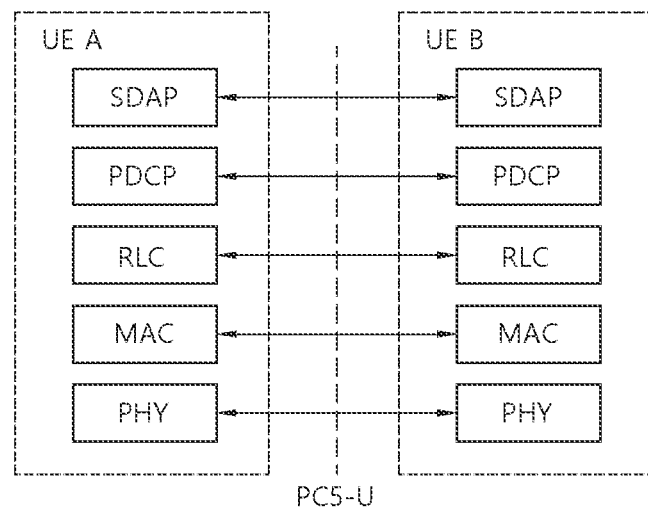
(a)
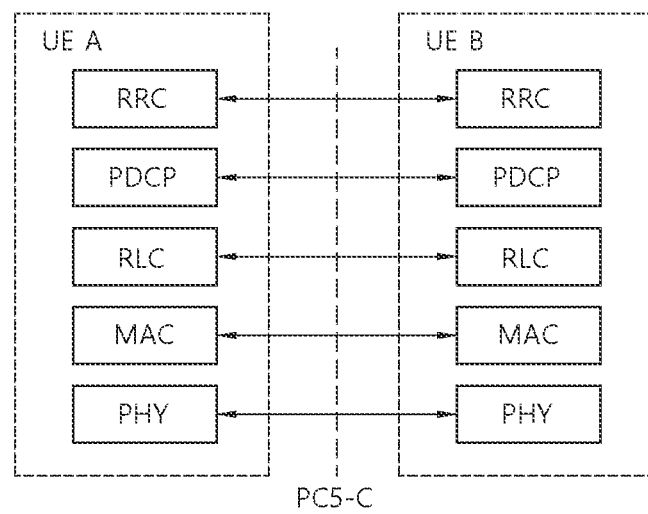
(b)

METHOD AND APPARATUS FOR SELECTING PSSCH RESOURCE IN NR V2X

CROSS-REFERENCE TO RELATED APPLICATIONS

This application is a National Stage application under 35 U.S.C. § 371 of International Application No. PCT/KR2020/000471, filed on Jan. 10, 2020, which claims the benefit of U.S. Provisional Application No. 62/791,705, filed on Jan. 11, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in case communication between UEs is performed, in order to increase a reliability of transmitted information, a UE receiving the information may transmit an HARQ-ACK signal for the information as a feedback signal. Therefore, an association between data resource(s) and feedback resource(s) needs to be proposed. In addition, a method for configuring PSFCH resource(s) that can be beneficial to a sensing operation of UE(s) needs to be proposed. In addition, a method for solving a half-duplex problem occurring on a feedback resource needs to be proposed.

Technical Solutions

In one embodiment, provided is a method for performing wireless communication by a first device. The method may comprise: determining a first PSSCH resource selected by a second device; selecting a second PSSCH resource; and transmitting a PSSCH by using the second PSSCH resource, wherein, a PSFCH resource related to the second PSSCH resource is not overlapped with a PSFCH resource related to the first PSSCH resource.

In one embodiment, provided is a first device configured to perform wireless communication. The first device may comprise: one or more memories storing instructions; one or more transceivers; and one or more processors connected to the one or more memories and the one or more transceivers. The one or more processors may execute the instructions to: determine a first PSSCH resource selected by a second device; select a second PSSCH resource; and transmit a PSSCH by using the second PSSCH resource, wherein, a PSFCH resource related to the second PSSCH resource is not overlapped with a PSFCH resource related to the first PSSCH resource.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
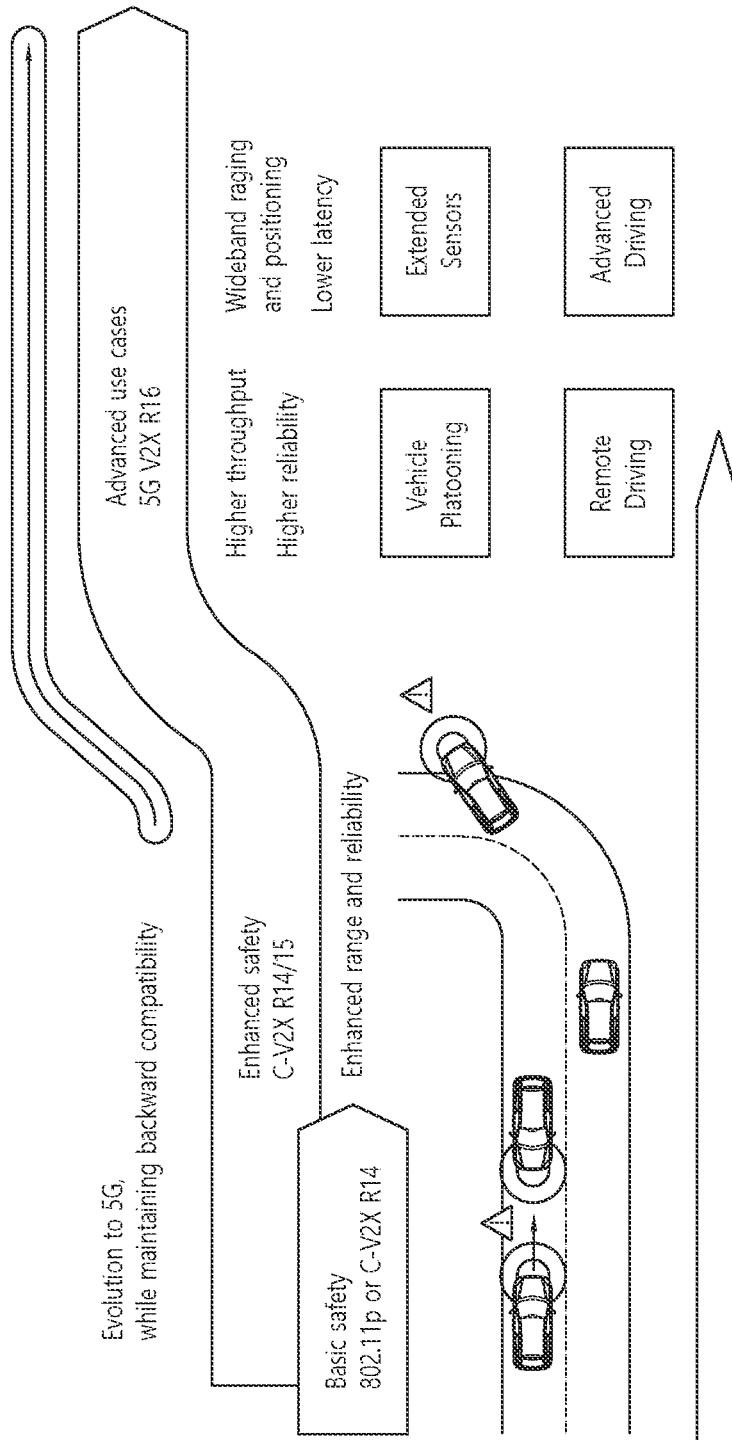
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
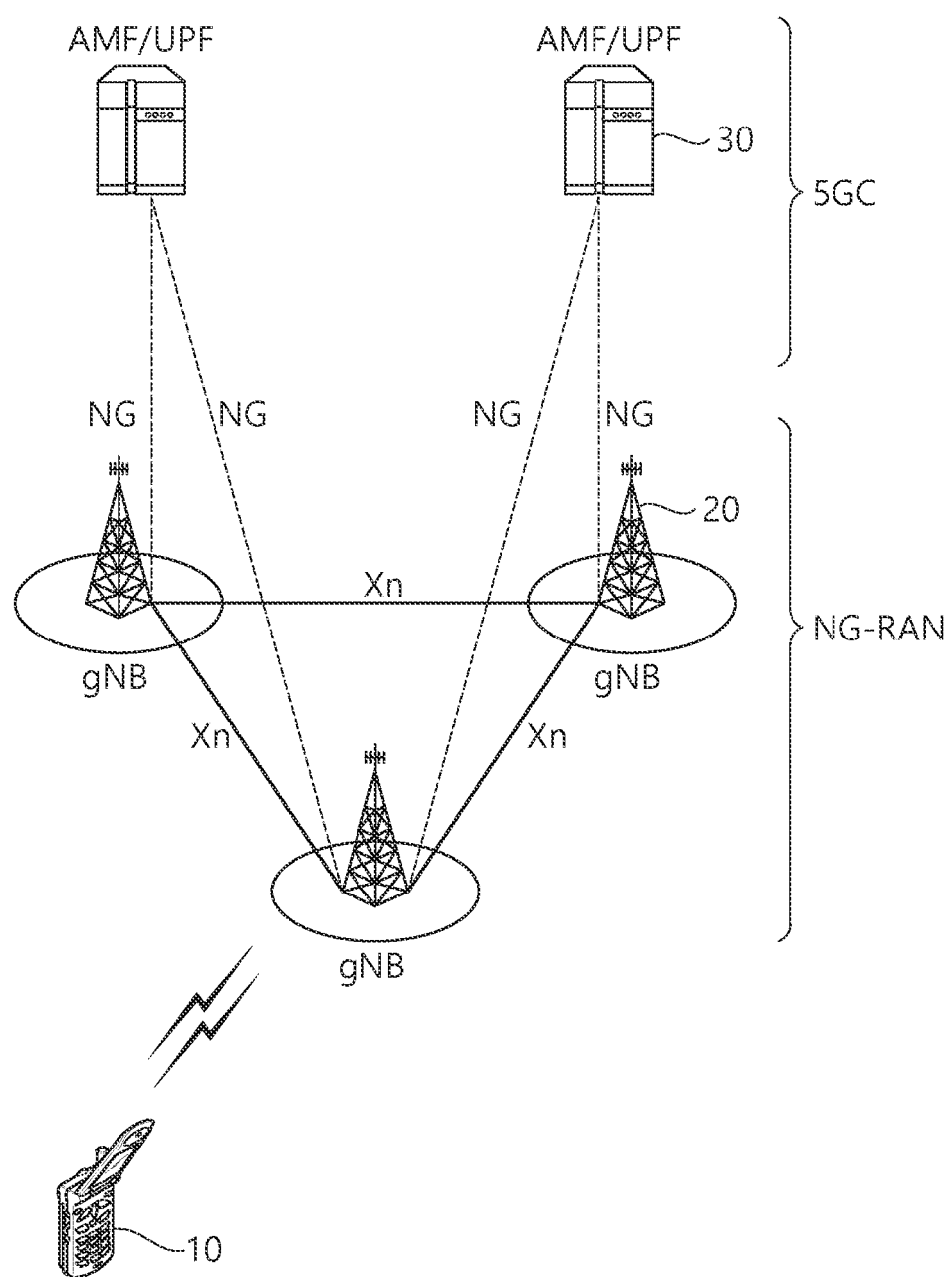
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
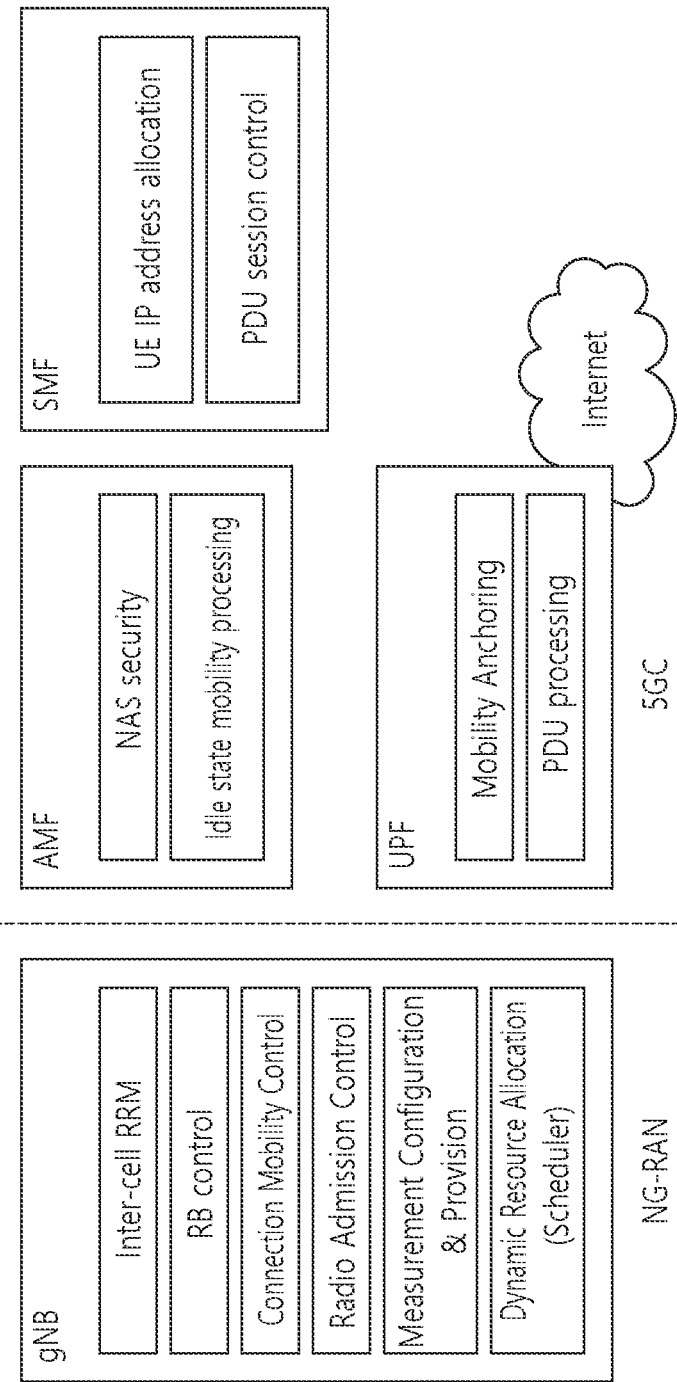
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
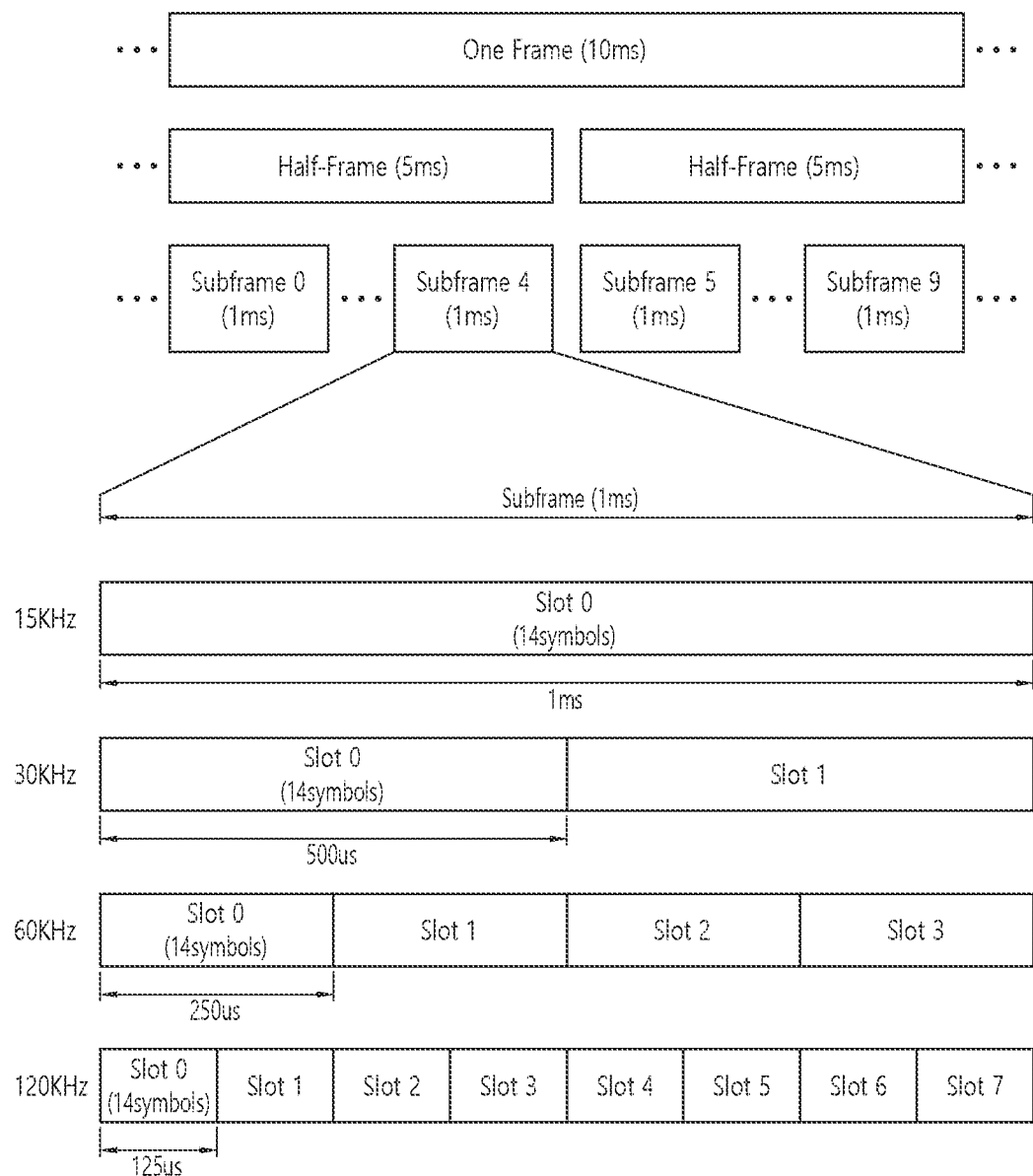
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
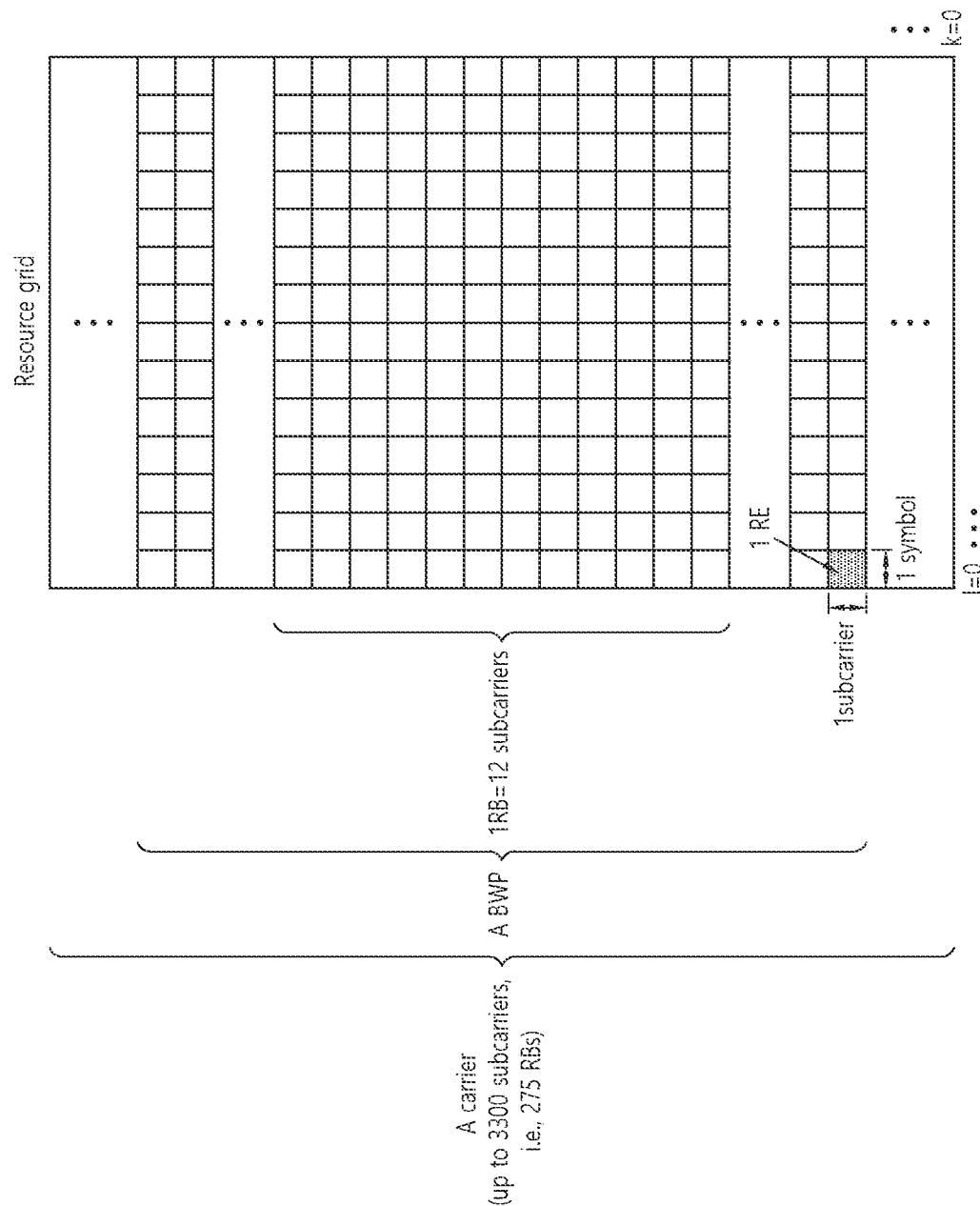
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
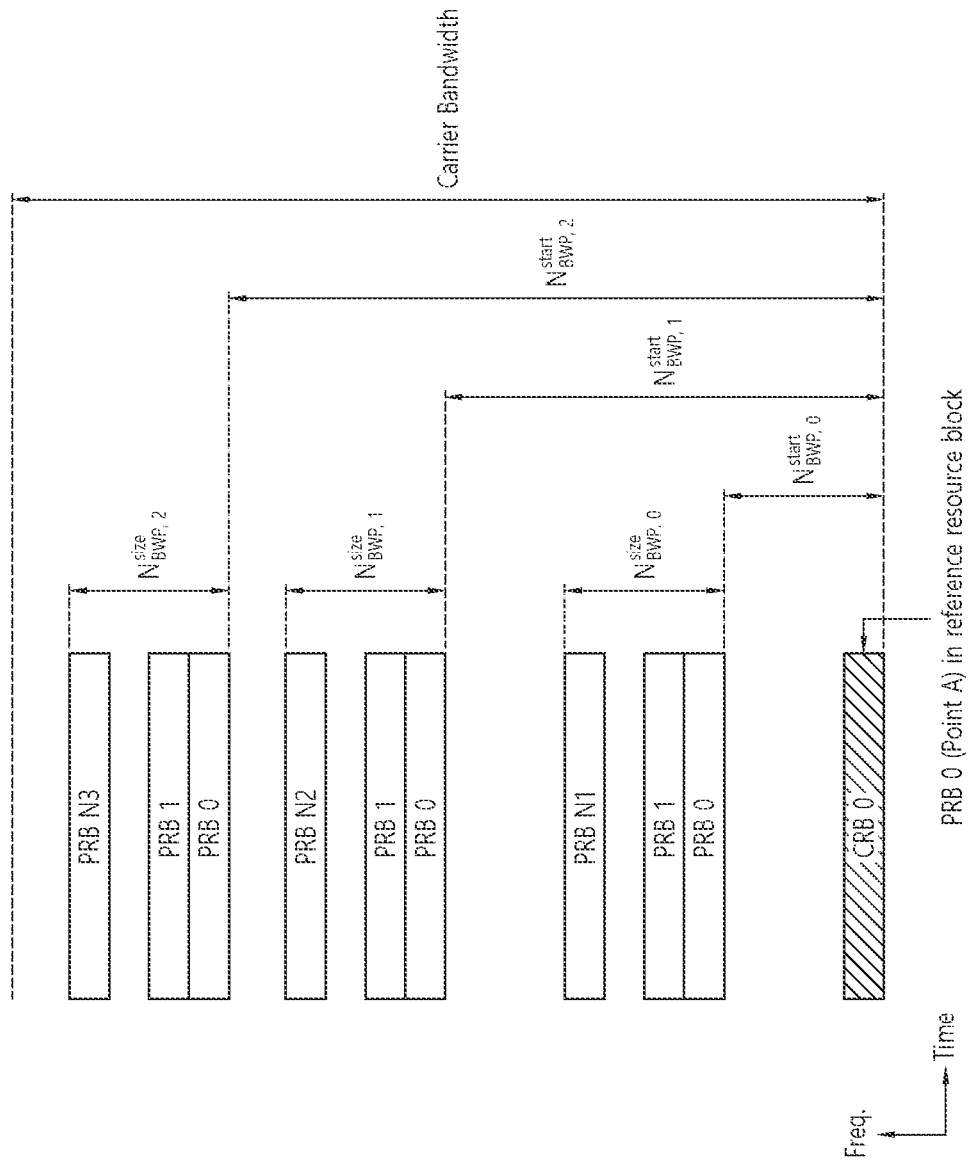
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
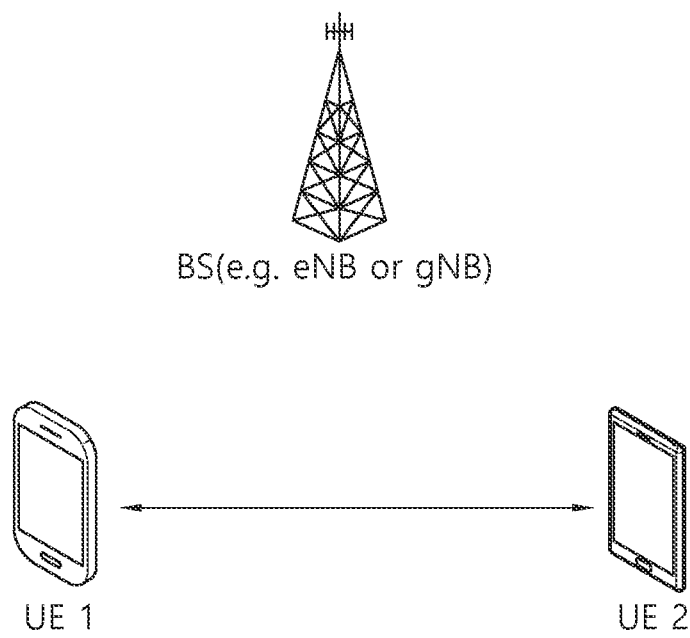
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
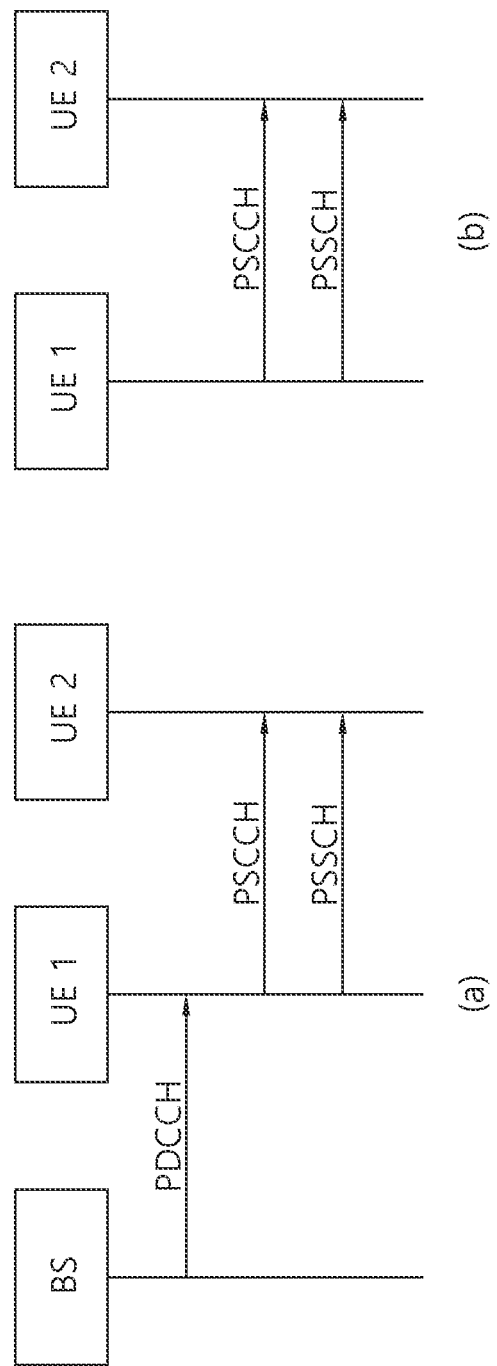
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
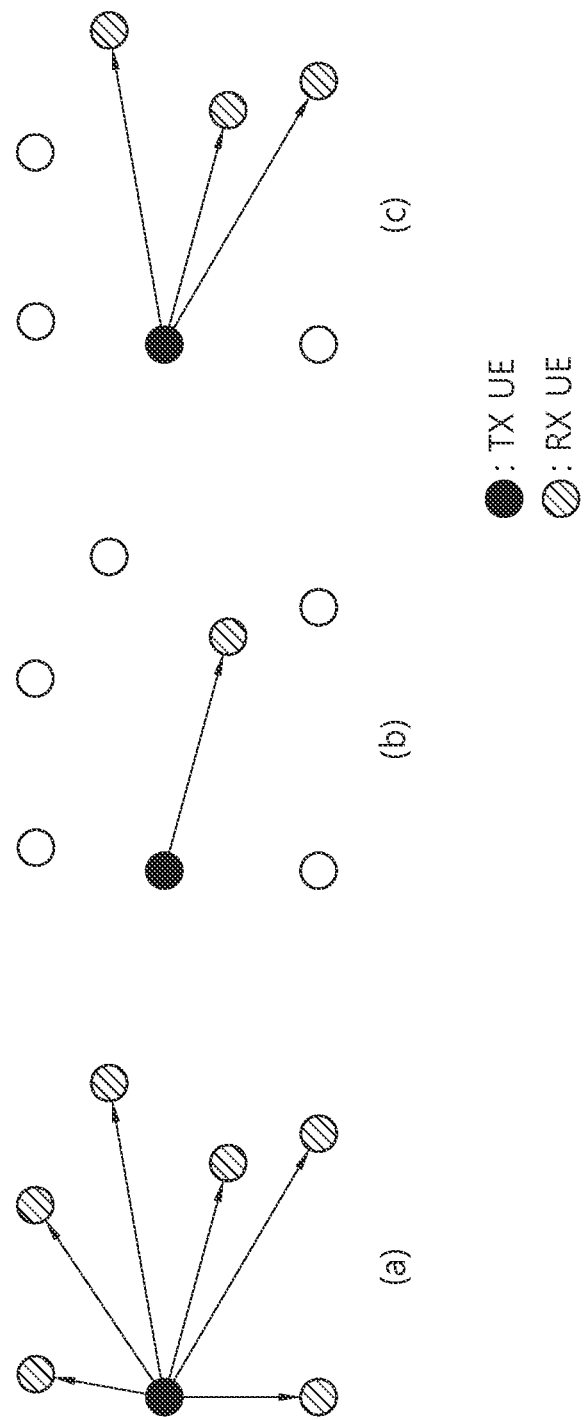
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

When communication is performed between UEs, a feedback signal such as a HARQ-ACK signal for transmitted information may be provided to improve the reliability of the corresponding information. For transmission of such a feedback signal, a UE may allocate some resources and provide the resources to other UEs. In addition, the location of the resources may be associated with resources of a data signal for which the feedback signal transmission is required. In legacy LTE V2X, since a single antenna is used for communication, one resource is allocated to one UE. However, in 3GPP Rel. 16 NR V2X, since multiple antennas are used for communication, one resource may be shared and used by multiple UEs.

Specifically, when UEs support V2X communication, each of the UEs may perform communication using time and frequency resources available for each UE within a resource pool available for sidelink communication. In this case, as the number of adjacent UEs increases, the number of UEs performing transmission on the same frequency at the same time through multi-user MIMO (MU-MIMO) may increase. In other words, the number of UEs using the same time/frequency resource may increase. This problem may occur for both control and data channels. That is, a HARQ-ACK signal indicating the success or failure of reception of a previous data channel may be transmitted on the same frequency at the same time. In this case, HARQ-ACK resources may overlap. Thus, even if a UE transmits a HARQ-ACK signal after receiving a PSSCH, a UE that transmits the PSSCH may not receive the HARQ-ACK signal.

Therefore, when a UE transmits a HARQ-ACK signal, the UE may need to indicate which PSSCH the corresponding HARQ-ACK signal is for. In other words, upon receiving a feedback signal, a UE may need to identify from which UE the corresponding feedback is transmitted. Hereinafter, a description will be given of a method of efficiently configuring a location at which a HARQ-ACK signal is transmitted within a resource pool when the same time and frequency resources are used between V2X UEs. In D2D communication, when resources for data transmission overlap, feedback resources associated with the data resources may also overlap. In the following embodiment(s), a method of between resources will also be described.

Hereinafter, a control channel is referred to as a PSCCH, a data channel is referred to as a PSSCH, and a channel for carrying a HARQ-ACK signal is referred to as a physical sidelink feedback channel (PSFCH). In addition, multiple PSFCH resources may be configured within one slot, and each PSFCH resource may be assigned a different resource index. A specific PSFCH resource index may be identified from other PSFCH resource indices by the location of a time and/or frequency resource. In the case of PSFCH transmission based on PSFCH DMRSs or sequences, difference sequence indices may be used for identification. For example, a plurality of PSFCH resources may be configured in one slot according to classification of time and/or frequency resources, and sequence-based PSFCHs may be multiplexed for each resource. PSFCHs transmitted on each resource may be identified again by PSFCH sequence indices. The plurality of PSFCH resources may be indexed separately, and in this case, indexing may be predetermined between transmitting and receiving UEs. When configuring a resource pool, the network may inform the UE of the configurations of PSFCH resources for each slot or each resource pool through physical layer signaling or higher layer signaling. For UEs out of the network coverage, such a configuration may be predetermined. The maximum number of multiplexed PSFCH resources in each resource pool or each slot may be configured to the UE through physical layer signaling or higher layer signaling. Alternatively, the number of PSFCH resources may be implicitly determined in each slot or in relation to the size of OFDM symbols included in the slot or the size of frequency resources included in the slot.

As described above, when a HARQ-ACK signal is transmitted for sidelink transmission in D2D communication, a UE receiving the HARQ-ACK signal needs to identify which UE transmits the corresponding HARQ-ACK signal. Specifically, when multiple UEs communicate with each other, UEs may use the same PSSCH resource. If the location of a PSFCH resource is determined in relation to the location of a PSSCH resource, UEs using the same PSFCH resource may also use the same PSSCH resource so that a transmitting UE may not properly receive a feedback signal. In this case, a UE receiving a PSFCH needs to be able to identify information on the corresponding PSFCH is feedback information for which PSSCH (that is, the UE needs to be able to identify which UE transmits the PSSCH). To this end, the UE may use information on the PSSCH or information on a PSCCH.

Figure 12:
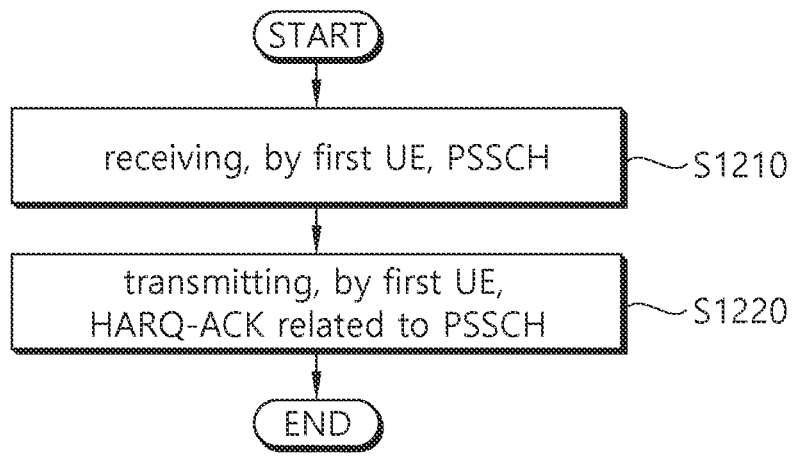
FIGS. 12 to 14 are flowcharts for explaining various embodiments of the present disclosure.

According to the embodiment(s), a first UE may receive a PSSCH (S1210 of FIG. 12) and transmit a HARQ-ACK for the PSSCH (S1220 of FIG. 12).

Herein, a resource region for the HARQ-ACK for the PSSCH may be frequency division multiplexed (FDM) with a resource region for a HARQ-ACK for each of at least one or more PSSCHs having the same starting subchannel or the same ending subchannel as the PSSCH. The PSSCH may or may not overlap with the at least one or more PSSCHs at least partially in the time domain. Specifically, for example, the PSSCH and the at least one or more PSSCHs may be transmitted in the same slot or different slot(s).

Independently of or in combination with the above description, the location of the resource region for the HARQ-ACK for the PSSCH may be determined based on the location of a PSSCH resource and at least one of the size of the PSSCH resource, an ARI transmitted on a PSCCH, a source ID transmitted on the PSCCH, a CRC, or a DMRS port. Hereinafter, a description will be given of at least one (combination) of the above-listed elements that determine the location of the resource region for the HARQ-ACK for the PSSCH.

The location of the resource region for the HARQ-ACK for the PSSCH may be determined based on the size of the PSSCH resource and the location of the PSSCH resource. That is, the location of a PSFCH resource may be configured based on the PSSCH resource location and the PSSCH resource size (e.g., RB size or subchannel size). Here, the PSSCH resource location may be a subchannel index related to the PSSCH, and the subchannel index related to the PSSCH may be one of the starting subchannel index or ending subchannel index of the PSSCH resource. In addition, the PSSCH resource size may be one of a subchannel size or an RB size. Based on this fact, when two different UEs transmit PSSCHs with the same starting subchannel, the PSSCHs may have different ending subchannels depending on the payload sizes of the PSSCHs or the amount of resources used therefor. In this case, PSFCH frequency resources may be identified by the corresponding information. For example, when one UE uses subchannels n to n+a and the other UE uses subchannels n to n+b, the starting position or offset of the PSFCH resource may be indicated by a and b (or by a function of a and b).

Figure 13:
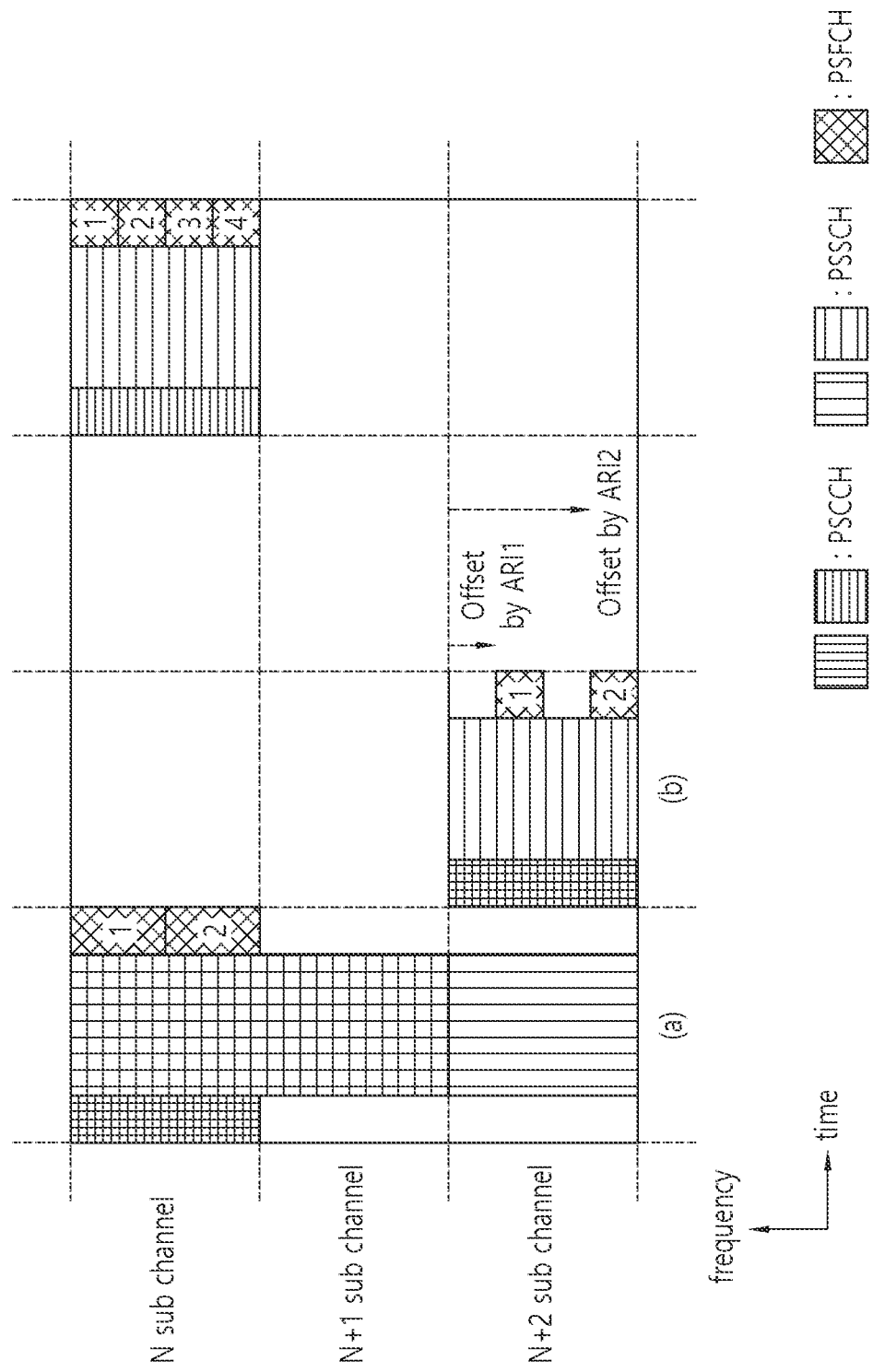

Referring to FIG. 13, the region for a PSFCH related to a PSSCH transmitted using [n, n+1] and [n, n+2] may be divided into two regions: [n, n+½] and [n+½, n+2/2] as shown in (a) of FIG. 13 (although FIG. 13 shows that radio resources have different locations, not only different resource locations but also different sequence indices, different antenna port indices, etc. may also be used to identify the index of a logical PSFCH resource). Similarly, when PSSCHs have the same ending subchannel, the PSFCH region may be identified based on starting subchannel information. If the payload size of a PSCCH related to the PSSCH or the amount of radio resources used therefor varies, the PSFCH resource location or the PSFCH resource index may be identified based on the above-described method.

In addition, the PSFCH resource index corresponding to the location of the resource region for the HARQ-ACK for the PSSCH may be determined by the following equation: PSFCH resource index=subchannel index+f1 (subchannel size). As described above, the location of the PSFCH region (PSFCH resource index) may be configured based on the starting (or ending) point (e.g., the first or the last subchannel index) of the frequency (or time) location of the PSSCH and the size of the resources used for the PSSCH (e.g., subchannel size or RB size). This may be expressed by the above equation. In the equation, f1 is a predetermined function or a function configurable by the network. For example, f1 may be defined as floor (a*(subchannel size−1)). This assumes that at least one subchannel will be used by the UE, and the scaling parameter a may be a number less than 1 when no PSFCH resources are generated for all subchannel size candidates. If sufficient PSFCH resources are generated for all subchannels, a may be a number greater than 1. The configuration of the sufficient PSFCH resources is to prevent PSFCH resource collisions between UEs using PSSCH resources with the same size.

As another example, the location of the resource region for the HARQ-ACK for the PSSCH may be determined based on the location of the ARI transmitted on the PSCCH and the PSSCH resource location. That is, when the PSCCH contains the ARI (ACK/NACK resource index or PSFCH resource index), the PSFCH resource or index may be identified by the corresponding information. To this end, the ARI may be transmitted on the PSCCH. The UE may configure the offset of the PSFCH based on the corresponding ARI. For example, as shown in (b) of FIG. 13, the offset of a PSFCH region for transmitting HARQ-ACK information for a PSSCH related to a corresponding control channel may be configured based on ARI1 in PSCCH1 and ARI2 in PSCCH2.

Based on the above description, the PSFCH resource index, which is the location of the resource region for the HARQ-ACK for the PSSCH, is determined by the following equation: PSFCH resource index=subchannel index+f3 (ARI), where f1 may be a predetermined function or a function configured by the network.

Figure 14:
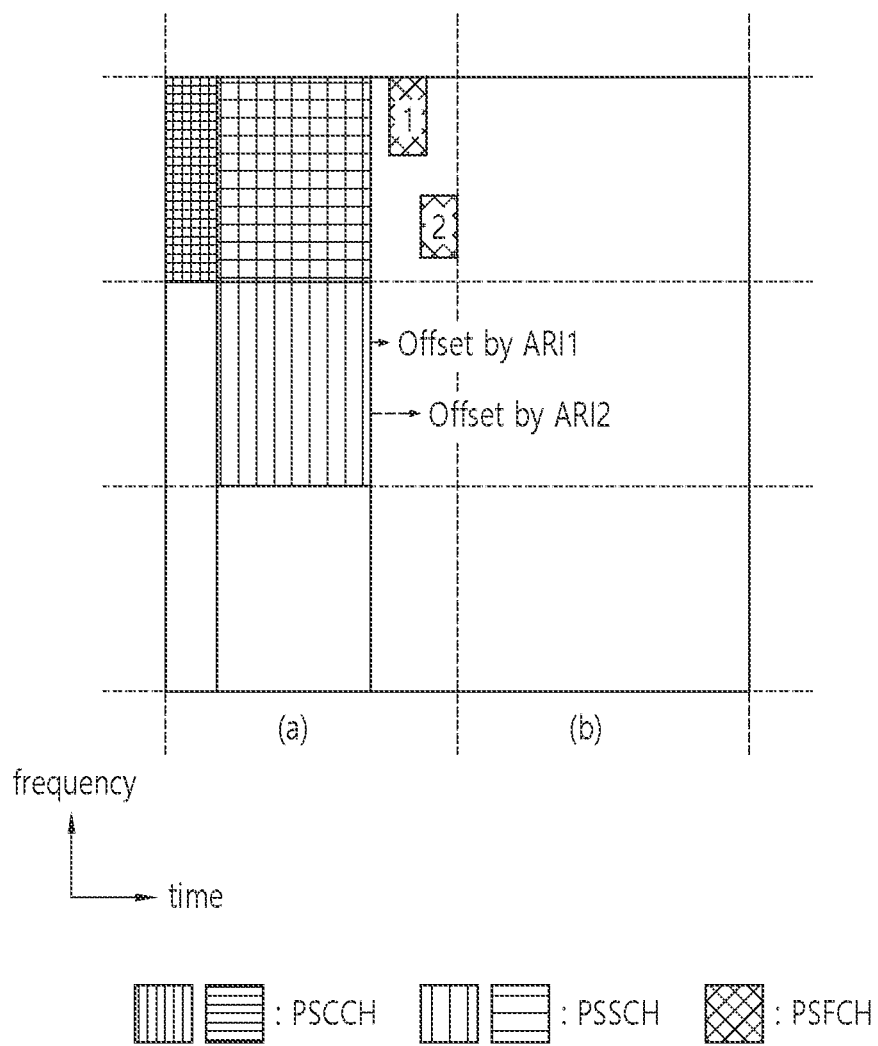

The ARI transmitted on the PSCCH may be one of a frequency-domain offset or a time-domain offset. That is, the ARI may configure not only the frequency-domain offset but also the time-domain offset. For example, when the UE receives the PSSCH in an n-th slot, the UE may transmit the PSFCH in an (n+x)-th slot. In this case, if a time-domain ARI is included in the PSCCH, the index of the slot for transmitting the PSFCH may vary. For example, when a service has a tight latency requirement, when a transmitting UE desires to receive feedback quickly, or when a collision between PSFCH resources is expected so as to avoid this, the time-domain ARI may be set to a non-zero value and signaled by the PSCCH. Alternatively, the following operation may be considered in relation to the configuration of the time-domain offset. The time offset (time-domain ARI) of the PSFCH may also be explicitly signaled by the PSCCH. That is, for a packet having a tight latency budget, the offset of the PSFCH region may be configured at a position close to the PSSCH (indication by ARID in the time domain as shown in FIG. 14.

As another example, the location of the resource region for the HARQ-ACK for the PSSCH may be determined based on the source ID transmitted on the PSCCH and the PSSCH resource location. That is, when the PSCCH contains source ID information, the PSFCH region may be identified by the corresponding information. For example, as shown in (c) of FIG. 13, the location of each of the four divided PSFCH regions may be indicated by two LSB bits of the source ID. That is, the location of the resource region for the HARQ-ACK for the PSSCH may correspond to one of the locations identified by the two LSB bits of the source ID. Based on the above description, the PSFCH resource index may be determined by the following equation: PSFCH resource index=subchannel index+f4 (source ID), where f4 may be a predetermined function or a function configurable by the network.

Regarding the determination of the location of the resource region for the HARQ-ACK for the PSSCH, the CRC may be a CRC of the PSCCH indicating the PSSCH. That is, the PSFCH region may be identified by the CRC of the PSCCH. For example, since the CRC of the PSCCH indicating the PSSCH related to the PSFCH has a unique value for each UE, the PSFCH resource index may be configured based on the corresponding information. For example, even when two different UEs use the same frequency resource, if MCSs are different, different PSCCH CRCs may be generated. This may be expressed by the following equation: PSFCH resource index=subchannel index+f2 (CRC), where f2 is a predetermined function or a function configurable by the network. For example, the PSFCH resource index may be determined by a table in which lower X bits among CRC bits are converted into PSFCH offsets. That is, the location of the resource region for the HARQ-ACK for the PSSCH may be determined based on the PSSCH resource location and the PSFCH offset corresponding to a predetermined number of LSB bits of the CRC.

As another example, the location of the resource region for the HARQ-ACK for the PSSCH may be determined based on the DMRS port and the PSSCH resource location. Here, the DMRS port may be related to either the PSCCH or PSSCH. That is, the PSFCH region may be identified by PSCCH or PSSCH DMRS port information. For example, assuming that a transmitting UE autonomously determines the port number of the PSSCH or the port number of the PSCCH, a UE receiving the PSSCH or PSCCH may determine the PSFCH resource location by combining some or all of the following: a DMRS port index, a DMRS sequence ID, a DMRS cyclic shift value, or the frequency shift value of a DMRS RE. To allow a receiving UE to successfully receive signals from two different UEs, the entirety or a part of the DMRS configuration may differ between the UEs. Based on this fact, the PSFCH resource location may be configured to vary as well. Based on the above description, the PSFCH resource index may be determined by the following equation: PSFCH resource index=subchannel index+f5 (DMRS port), where f5 is a predetermined function or a function configurable by the network.

In the above description, the resource region of the PSSCH may overlap at least partially with the resource region of at least one PSSCH transmitted by a third UE. In addition, to configure the PSFCH resource index, each of the above-described equations may be applied separately or in combination. In addition, the PSFCH resource index may be configured by replacing the subchannel index with the PSSCH RB index in the equations.

Although an additional offset is applied to the subchannel index in the embodiment(s), the subchannel index may be used as the input parameter of a certain function, and the PSFCH resource may be configured by a combination of all or some of the above-mentioned methods. For example, this may be expressed as follows: PSFCH resource index=f6 (subchannel index, subchannel size), where f6 is a function that is predetermined or configurable by the network. For example, it may be defined as A*subchannel index+ B*subchannel size+C.

The above methods may be similarly applied to DMRS sequences. For example, when feedback is required for different PSSCHs on the same resource, if there is an overlap between RS sequences, a problem may occur in channel estimation. If PDSCH/PUSCH DMRS generation in the NR system is similarly applied to the PSSCH, the offset may be configured in the same way as described above when a pseudo-random sequence is initialized to generate the DMRS sequence.

To identify/divide/distinguish the PSFCH region, each of the above-described methods may be used separately or in combination. In addition, although only the frequency-domain offsets are described in the above methods, time-domain offsets may also be configured. Further, both the frequency-domain and time-domain offsets may be configured in combination.

Hereinafter, based on various embodiments of the present disclosure, conditions to be additionally considered in the above-described proposed method are proposed. Furthermore, by further extending the above-described proposed method, a method of association between a PSSCH and a PSFCH to obtain more gain is proposed from a point of view of resource sensing. Furthermore, a method for solving a half-duplex problem that may be caused by the above-described proposed method and an apparatus supporting the same are proposed.

For example, the above-described FIGS. 13 and 14 are illustrated assuming a self-contained resource of NR. However, a time gap may exist between a PSSCH and a PSFCH related to the PSSCH. For example, in case of uplink synchronous HARQ operation of LTE system, a UE may transmit HARQ feedback to a base station at time point (n+4) from reception time point (n) of data, and the base station may perform retransmission of the data at time point (n+8). As such, based on an embodiment of the present disclosure, in NR V2X, the above-described PSFCH may exist at a location separated by a specific time gap from a time point when a receiving UE receives data (i.e., PSSCH) from a transmitting UE. For example, in the various embodiments described above, a PSFCH may exist at a location separated by a specific time gap from a PSSCH. For example, in order to simplify system design, the specific time gap may be a fixed time gap, such as synchronous HARQ operation.

Meanwhile, for example, if PSSCHs through which data are transmitted overlap in SL communication between UEs, PSFCH resources related to the PSSCHs may also overlap. Therefore, through the above-described various embodiments, a method for a UE to distinguish the PSFCH resources related to the PSSCHs, if PSSCHs through which data are transmitted overlap in SL communication between UEs, has been described. However, even in case where a UE distinguishes PSFCH resources related to non-overlapping PSSCHs, the above-described various embodiments may be applied.

Based on an embodiment of the present disclosure, the same PSFCH resource may be allocated for PSSCHs transmitted by a plurality of different UEs. For example, in case UE(s) performs NACK only transmission through a common PSFCH in groupcast communication, the same PSFCH resource may be allocated to a plurality of different UEs. In the above-mentioned case, based on the above various schemes, a PSFCH related to a plurality of PSSCHs may refer to the same resource. More specifically, for example, in case of (a) of FIG. 13, PSFCHs related to two overlapping PSSCHs are configured to be divided into PSFCH1 and PSFCH2, respectively. However, in case of a scenario in which the same PSFCH is configured as described above, for example, a PSFCH related to two PSSCHs may be one resource in which PSFCH1 and PSFCH2 are combined, and each PSSCH may be defined to refer to the combined PSFCH.

Based on the above proposal, a PSSCH and a PSFCH may be correlated. Accordingly, from a point of view that a UE occupies data resource(s) (e.g., in terms of sensing operation), there may be an advantage that the UE can automatically exclude a PSFCH. From this point of view, feedback resource(s) related to the PSSCH may refer to a set of PSFCH resources (hereinafter, referred to as PSFCH SET), not one PSFCH resource. For example, in various embodiments of the present disclosure, in case a transmitting UE transmits a PSSCH to a receiving UE, the transmitting UE may receive HARQ feedback for the PSSCH through any one of PSFCH resources included in PSFCH SET related to the PSSCH from the receiving UE. Alternatively, for example, a transmitting UE may transmit a PSSCH to a receiving UE, and may transmit HARQ feedback to the receiving UE through any one of PSFCH resources included in PSFCH SET related to the PSSCH. Therefore, based on an embodiment of the present disclosure, there may be the following correlation between a PSSCH and PSFCH SET. For example, a UE may classify and configure a resource location of PSFCH SET, by using PSSCH-related parameter(s) and/or a resource unit in which the UE performs sensing. For example, the PSSCH-related parameter(s) may include a PSSCH-related resource location and/or a PSSCH-related resource size. For example, the PSSCH-related resource location may include at least one of a start location of the PSSCH (e.g., a start time location of the PSSCH and/or a start frequency location of the PSSCH), an end location of the PSSCH (e.g., an end time location of the PSSCH and/or an end frequency location of the PSSCH), and/or a subchannel index related to the PSSCH. For example, the PSSCH-related resource size may include an RB size and/or a subchannel size. For example, a resource unit in which the UE performs sensing may be one or more subchannels.

For example, if a plurality of UEs transmit PSSCHs, and if PSSCH-related parameters (e.g., start locations of PSSCHs, end locations of PSSCHs, or subchannel indices of PSSCHs) are the same, PSFCH SET may be the same. In order to distinguish PSFCHs of different UEs within the same PSFCH SET, the following proposed method may be used.

For example, if start locations of PSSCHs are the same, the UE may distinguish different PSFCHs from each other in PSFCH SET based on end locations of PSSCHs or PSSCH-related resource sizes. For example, if end locations of PSSCHs are the same, the UE may distinguish different PSFCHs from each other in PSFCH SET based on start locations of PSSCHs or PSSCH-related resource sizes. For example, if PSSCH-related resource sizes are the same, the UE may distinguish different PSFCHs from each other in PSFCH SET based on PSSCH-related resource locations.

Alternatively, for example, the UE may distinguish between different PSFCHs in PSFCH SET based on PSSCH-related resource locations and ARIs transmitted through PSCCHs. Alternatively, for example, the UE may distinguish between different PSFCHs in PSFCH SET based on PSSCH-related resource locations and source IDs transmitted through PSCCHs. In this case, based on PSCCH-related information (e.g., ARI, source ID, destination ID, explicit PSFCH location information, etc.) and/or parameter(s) (e.g., CRC, PSCCH DM-RS related parameter(s)), the UE may distinguish between different PSFCHs in PSFCH SET. Specifically, for example, a PSFCH index in PSFCH SET may be determined based on a function of source ID, destination ID, and/or ARI among PSCCH-related information, and ARI may also directly indicate the PSFCH index. Also, for example, the PSCCH DM-RS related parameter(s) among the parameter(s) may be a DM-RS pattern index and/or a DM-RS cyclic shift value.

Based on the above-described embodiment, in case a UE performs a sensing operation for data channel(s), the UE can more efficiently exclude PSFCH resource(s). For example, a UE may perform a sensing operation based on SCI decoding or may perform a sensing operation based on energy measurement (e.g., RSSI) for resource(s). In this case, even if the UE fails to decode the SCI, since the UE performs sensing based on energy measurement for the resource(s), for example, if the UE determines that the sensed resource(s) is(/are) occupied by other UE(s) based on RSSI measurement, the UE may perform exclusion operation(s) for PSFCH SET defined above together with exclusion operation(s) for PSSCH resource(s). That is, for example, PSSCH resource(s) and PSFCH SET related to the PSSCH resource(s) may be excluded together. For example, if PSFCH SET is divided for each subchannel, and if a UE excludes data transmission on two subchannels, the UE may exclude a total of three PSFCH SETs (e.g., PSFCH related to subchannel #1, PSFCH related to subchannel #2, and PSFCH related to subchannels #1 to #2). Based on the above process, since PSFCH SET is distinguished based on PSSCH-related parameter(s), even if a UE fails to decode a PSCCH, the UE may not incorrectly select a PSFCH. The above operation may be similarly applied to a case in which a specific UE (e.g., an assisting UE, or a group header UE) transmits assistance information related to resource allocation to other UE(s). For example, an assisting UE, which helps in resource allocation of other UE(s), may transmit information regarding PSSCH resource(s) and the PSFCH SET to be excluded based on the sensing process, under the above-described condition, to other UE(s). For example, an assisting UE, which helps in resource allocation of other UE(s), may transmit information regarding PSSCH resource(s) and the PSFCH SET available based on the sensing process, under the above-described condition, to other UE(s).

Meanwhile, based on the above-described embodiment, a half-duplex problem may occur on a PSFCH resource. For example, a time gap may exist between a PSSCH resource and a PSFCH resource related to the PSSCH resource, and the time gap may be different based on a type of service to be transmitted by a UE, service requirements (e.g., priority, delay, or QoS parameters), and the like. In this case, problems described in the embodiment of FIG. 15 or FIG. 16 may occur.

Figure 15:
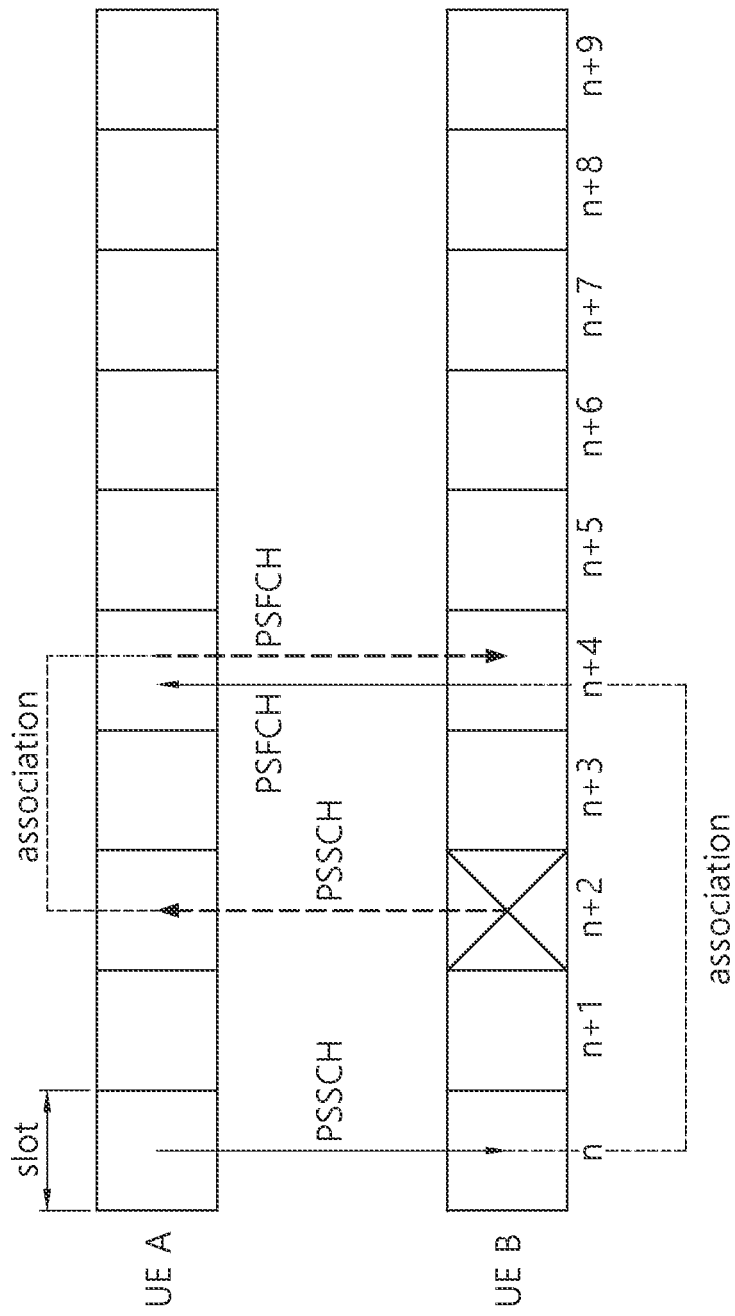
FIG. 15 shows an example in which a half-duplex problem occurs on a PSFCH resource, based on an embodiment of the present disclosure.

FIG. 15 shows an example in which a half-duplex problem occurs on a PSFCH resource, based on an embodiment of the present disclosure. The embodiment of FIG. 15 may be combined with various embodiments of the present disclosure. In the embodiment of FIG. 15, it is assumed that a PSSCH transmitted by a transmitting UE to a receiving UE is related to a PSFCH transmitted by the receiving UE to the transmitting UE.

Referring to FIG. 15, UE A may transmit data to UE B in slot n, and UE B may transmit feedback information related to the data to UE A in slot n+4. In addition, UE B may transmit data to UE A in slot n+2, and UE A may transmit feedback information related to the data to UE B in slot n+4. In this case, there may be a problem in that UE A should simultaneously transmit and receive PSFCH in slot n+4. Similarly, there may be a problem in that UE B should simultaneously transmit and receive PSFCH in slot n+4.

Figure 16:
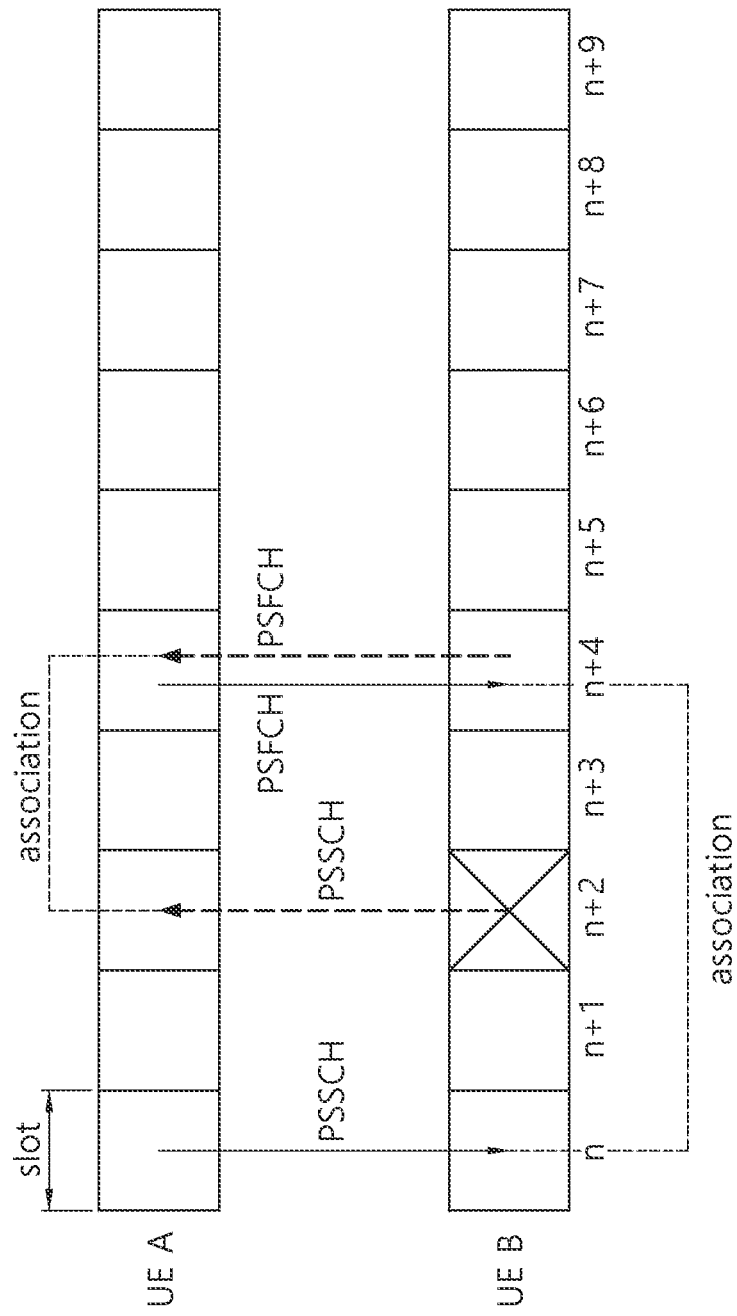
FIG. 16 shows an example in which a half-duplex problem occurs on a PSFCH resource, based on an embodiment of the present disclosure.

FIG. 16 shows an example in which a half-duplex problem occurs on a PSFCH resource, based on an embodiment of the present disclosure. The embodiment of FIG. 16 may be combined with various embodiments of the present disclosure. In the embodiment of FIG. 16, it is assumed that a PSSCH transmitted by a transmitting UE to a receiving UE is related to a PSFCH transmitted by the transmitting UE to the receiving UE.

Referring to FIG. 16, UE A may transmit data to UE B in slot n, and UE A may transmit feedback information related to the data to UE B in slot n+4. In addition, UE B may transmit data to UE A in slot n+2, and UE B may transmit feedback information related to the data to UE A in slot n+4. In this case, there may be a problem in that UE A should simultaneously transmit and receive PSFCH in slot n+4. Similarly, there may be a problem in that UE B should simultaneously transmit and receive PSFCH in slot n+4.

The above-described problem does not occur only when the slot gap between a PSSCH and a PSFCH is different between UEs. For example, even if the slot gap between a PSSCH and a PSFCH is configured the same for all UEs, the above-described problem may still occur if a UE needs to transmit an urgent message with a short delay requirement and also needs to receive a PSFCH within a short time.

In order to solve the half-duplex problem, based on an embodiment of the present disclosure, if a transmitting UE detects a specific PSSCH resource occupied by other UE(s) based on a sensing process in advance in a resource occupancy process, the transmitting UE may have to select PSSCH resource(s) so that PSFCH resource(s) related to the PSSCH resource(s) is(/are) not overlapped with PSFCH resource(s) related to the specific PSSCH resource due to occupation/selection of the PSSCH resource(s) of the transmitting UE. That is, for example, if the transmitting UE excludes unselectable resource(s) in a sensing process for selecting PSSCH resource(s), the transmitting UE may exclude all PSSCH resources related to PSFCH resource(s) used by other UE(s). Therefore, in case a UE excludes unavailable PSSCH resource(s), if the UE detects/determines that other UE(s) will use PSFCH resource(s) related to specific PSSCH resource(s), the UE may exclude the specific PSSCH resource(s). More specifically, it is assumed that a specific UE transmits data by selecting a specific PSSCH resource, and that the specific UE receives HARQ feedback on a PSFCH resource related to the specific PSSCH resource. In this case, if the specific UE transmits HARQ feedback on the PSFCH resource at the same time, a half-duplex problem may occur on the PSFCH resource (i.e., HARQ feedback resource). In this case, for example, if a UE, which desires to select a PSSCH resource for transmission of a service with a short latency requirement, should transmits HARQ feedback on the PSFCH resource based on decoding of PSSCH related to a service with a long latency requirement previously received, the UE may not select PSSCH resource(s) in slot(s) related to the feedback transmission resource (due to the short delay requirement). For example, referring to FIG. 15, if UE B transmits a PSSCH in slot n+2, a half-duplex problem may occur in slot n+4. Accordingly, UE B may not select a PSSCH resource in slot n+2. For example, referring to FIG. 16, if UE B transmits a PSSCH in slot n+2, a half-duplex problem may occur in slot n+4. Accordingly, UE B may not select a PSSCH resource in slot n+2.

Figure 17:
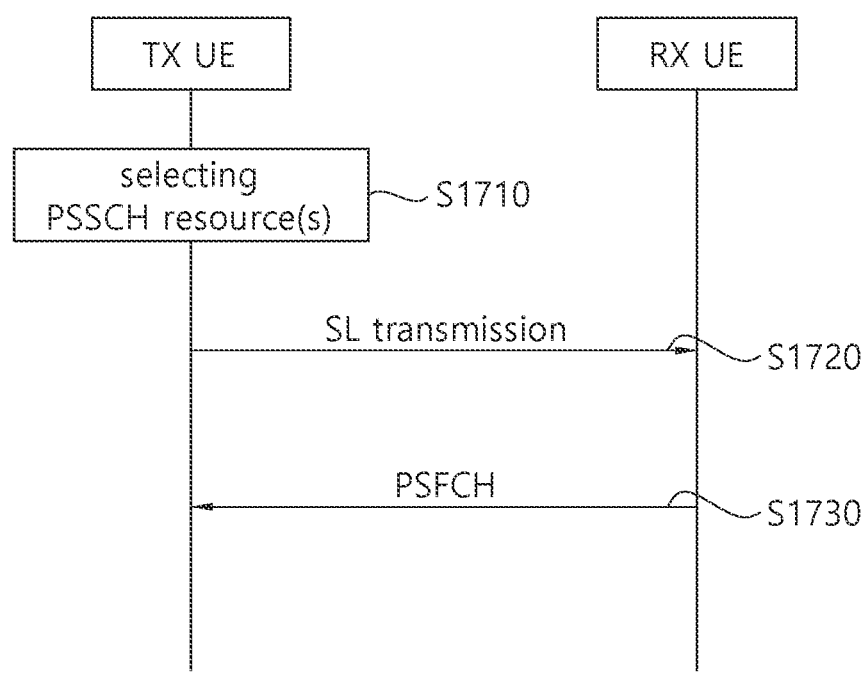
FIG. 17 shows a procedure in which a transmitting UE performs SL transmission by excluding specific resource(s), based on an embodiment of the present disclosure.

FIG. 17 shows a procedure in which a transmitting UE performs SL transmission by excluding specific resource(s), based on an embodiment of the present disclosure. The embodiment of FIG. 17 may be combined with various embodiments of the present disclosure.

Referring to FIG. 17, in step S1710, the transmitting UE may select PSSCH resource(s). For example, the transmitting UE may select PSSCH resource(s) based on sensing. For example, the transmitting UE may determine that a PSFCH resource related to a specific PSSCH resource and a PSFCH resource related to a PSSCH resource occupied by other UE(s) overlap each other. In this case, the transmitting UE may not occupy the specific PSSCH resource. For example, the specific PSSCH resource may be excluded from resource selection.

In step S1720, the transmitting UE may perform SL transmission using the selected PSSCH resource. In step S1730, the transmitting UE may receive HARQ feedback from a receiving UE through a PSFCH.

Accordingly, based on various embodiments of the present disclosure, it is possible to prevent the half-duplex problem from occurring on PSFCH resource(s).

Figure 18:
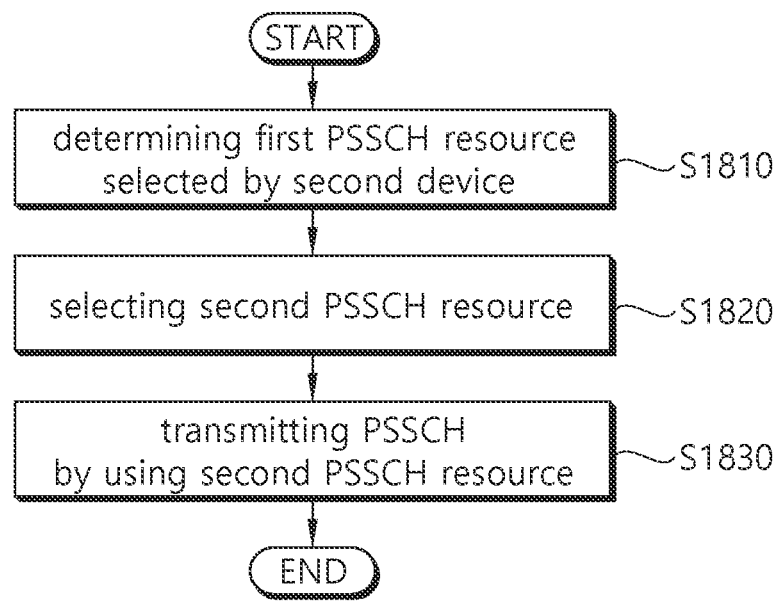
FIG. 18 shows a method for a first device to perform wireless communication, based on an embodiment of the present disclosure.

FIG. 18 shows a method for a first device to perform wireless communication, based on an embodiment of the present disclosure. The embodiment of FIG. 19 may be combined with various embodiments of the present disclosure.

Referring to FIG. 18, in step S1810, the first device may determine a first PSSCH resource selected by a second device. For example, the first PSSCH resource selected by the second device may be determined by the first device based on sensing. For example, energy measured by the first device on the first PSSCH resource may be larger than or equal to a threshold.

In step S1820, the first device may select a second PSSCH resource. For example, a PSFCH resource related to the second PSSCH resource may be not overlapped with a PSFCH resource related to the first PSSCH resource. For example, the second PSSCH resource may be selected by the first device based on sensing. For example, energy measured by the first device on the second PSSCH resource may be less than or equal to a threshold.

In step S1830, the first device may transmit a PSSCH by using the second PSSCH resource.

For example, a time gap between the second PSSCH resource and the PSFCH resource related to the second PSSCH resource may be pre-configured for the first device.

For example, a PSFCH resource related to a third PSSCH resource may be overlapped with the PSFCH resource related to the first PSSCH resource. In this case, the third PSSCH resource may be not selected by the first device for transmission of the PSSCH. For example, energy measured by the first device on the third PSSCH resource may be less than or equal to a threshold. For example, even if the energy measured by the first device on the third PSSCH resource is less than or equal to the threshold, the third PSSCH resource may not be selected by the first device for transmission of the PSSCH. For example, the energy measured on the third PSSCH resource may be an RSSI measured by the first device on the third PSSCH resource.

Additionally, for example, the first device may determine that the PSFCH resource related to the second PSSCH resource is used by the second device.

Additionally, for example, the first device may receive HARQ feedback related to the PSSCH on the PSFCH resource related to the second PSSCH resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: determine a first PSSCH resource selected by a second device; select a second PSSCH resource; and transmit a PSSCH by using the second PSSCH resource. In this case, a PSFCH resource related to the second PSSCH resource may be not overlapped with a PSFCH resource related to the first PSSCH resource.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: determine a first PSSCH resource selected by a second UE; select a second PSSCH resource; and transmit a PSSCH by using the second PSSCH resource. In this case, a PSFCH resource related to the second PSSCH resource may be not overlapped with a PSFCH resource related to the first PSSCH resource.

Based on an embodiment of the present disclosure, anontransitory computer-readable storage medium storing instructions may be provided. For example, the instructions, when executed, may cause a first device to: determine a first PSSCH resource selected by a second device; select a second PSSCH resource; and transmit a PSSCH by using the second PSSCH resource. In this case, a PSFCH resource related to the second PSSCH resource may be not overlapped with a PSFCH resource related to the first PSSCH resource.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
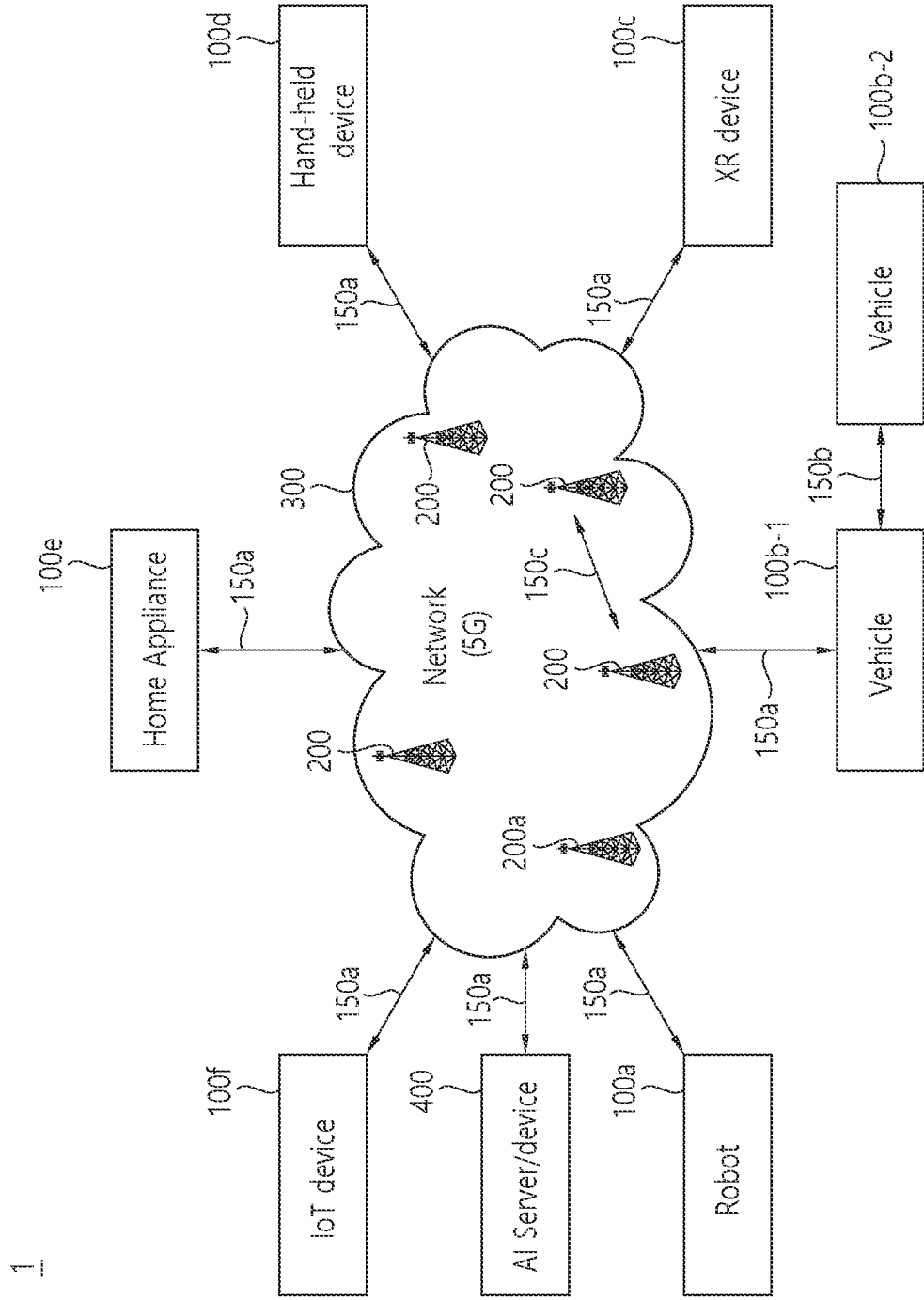
FIG. 19 shows a communication system 1, based on an embodiment of the present disclosure.

FIG. 19 shows a communication system 1, based on an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
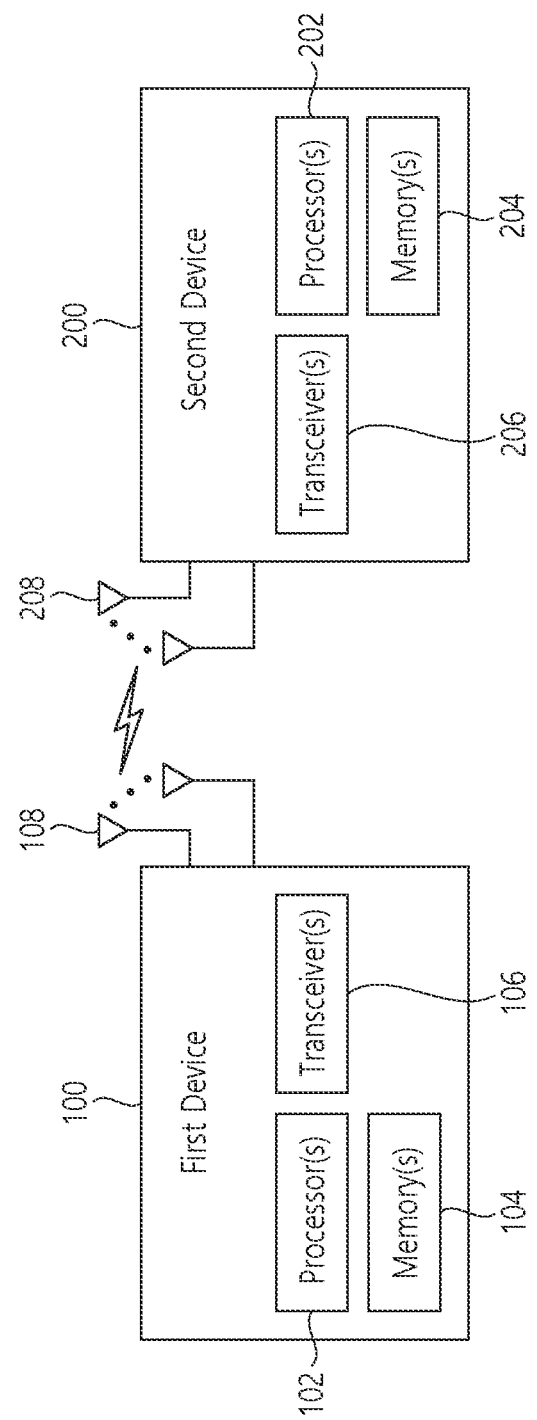
FIG. 20 shows wireless devices, based on an embodiment of the present disclosure.

FIG. 20 shows wireless devices, based on an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
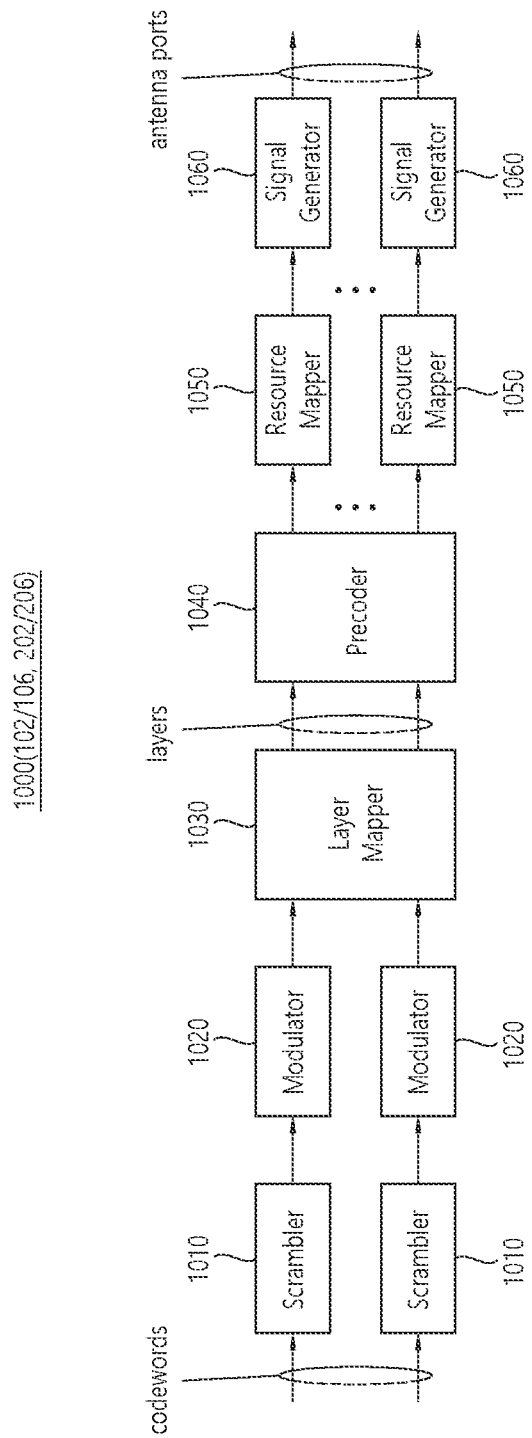
FIG. 21 shows a signal process circuit for a transmission signal, based on an embodiment of the present disclosure.

FIG. 21 shows a signal process circuit for a transmission signal, based on an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
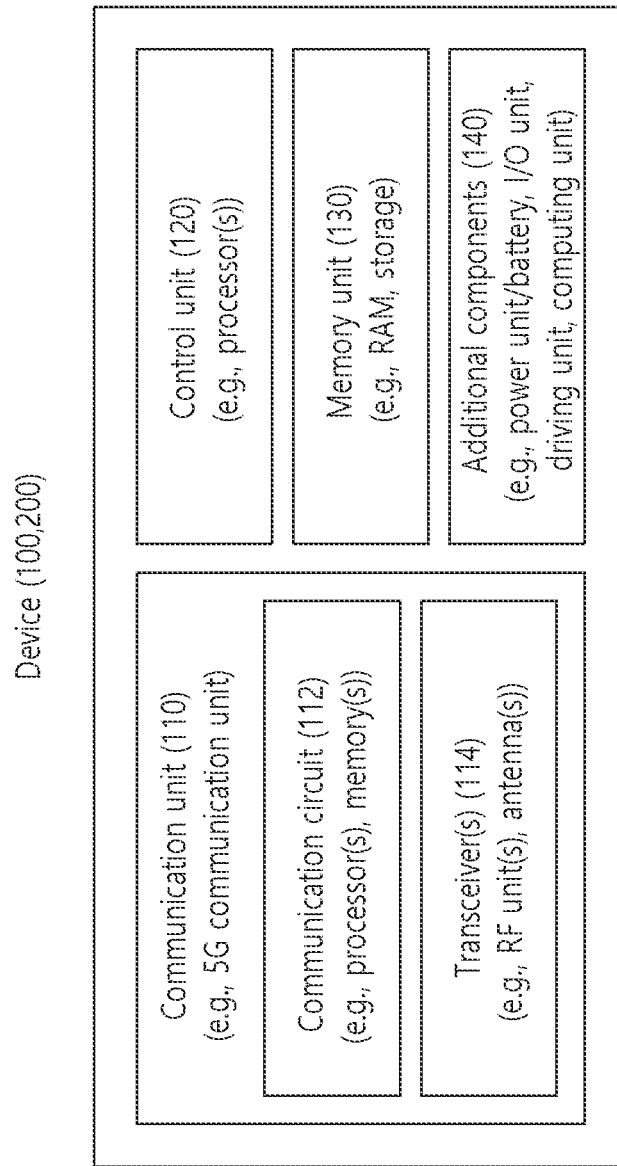
FIG. 22 shows another example of a wireless device, based on an embodiment of the present disclosure.

FIG. 22 shows another example of a wireless device, based on an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
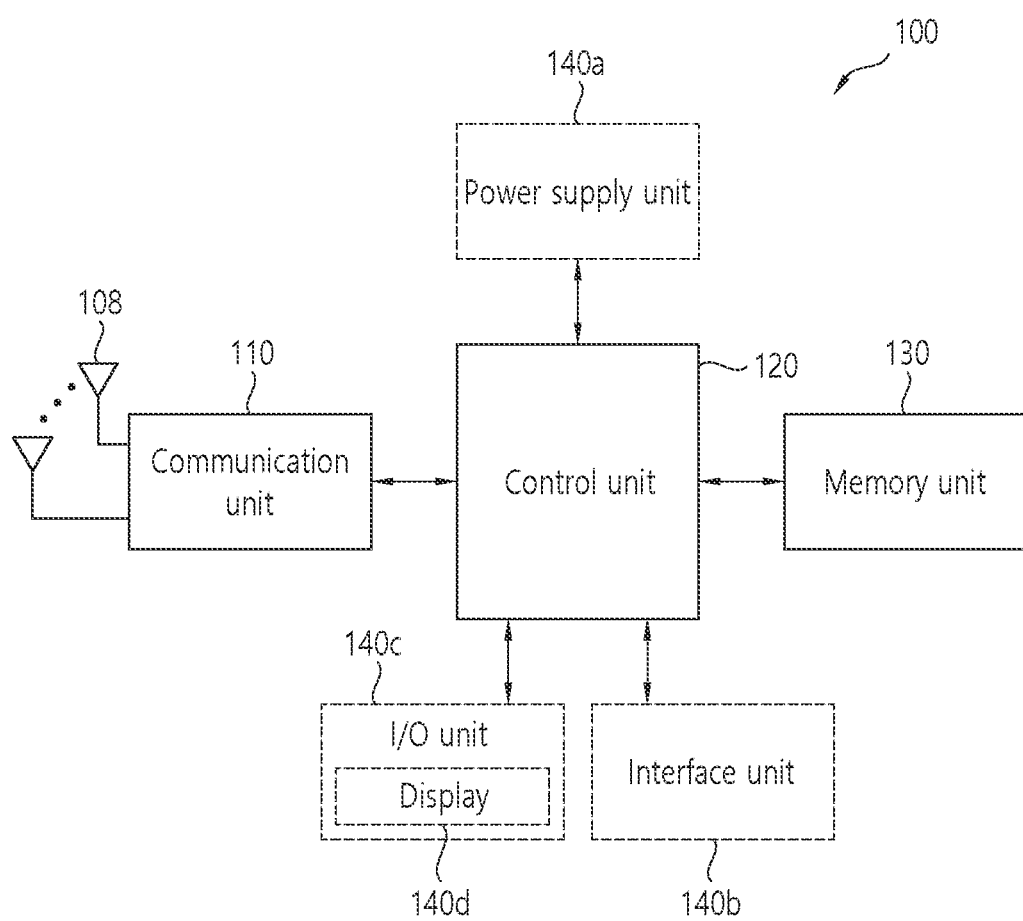
FIG. 23 shows a hand-held device, based on an embodiment of the present disclosure.

FIG. 23 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
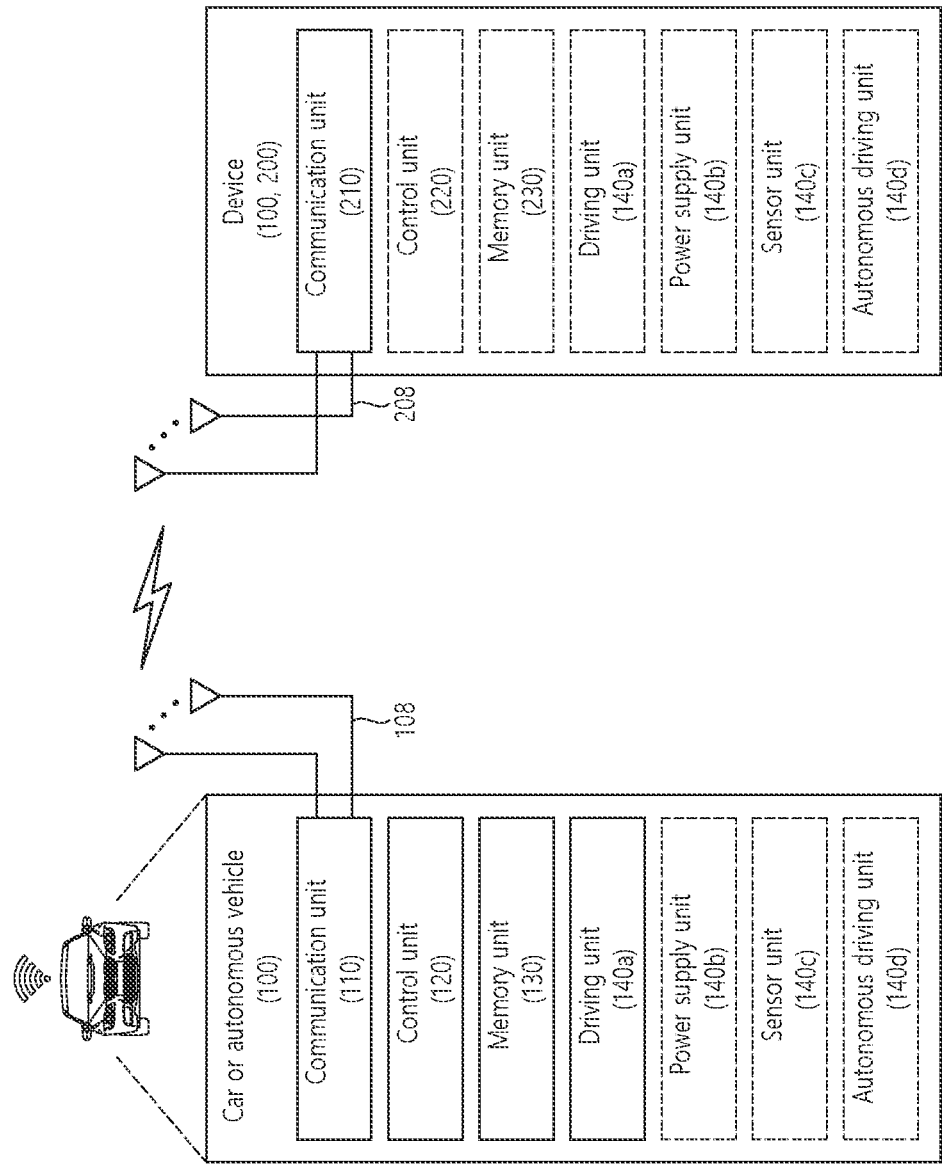
FIG. 24 shows a vehicle or an autonomous vehicle, based on an embodiment of the present disclosure.

FIG. 24 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   triggering a resource selection;
   determining a selection window, based on a resource selection being triggered;

selecting a first physical sidelink shared channel (PSSCH) resource within the selection window;

determining (i) a first physical sidelink feedback channel (PSFCH) slot related to the first PSSCH resource and (ii) at least one PSSCH resource related to the first PSFCH slot;

performing sidelink (SL) transmission, based on the first PSSCH resource; and transmitting, to a second device, assistance information related to the at least one PSSCH resource not preferred by the first device, wherein a second PSSCH resource selected by the second device is not included in the at least one PSSCH resource, and wherein a second PSFCH slot related to the second PSSCH resource is different from the first PSFCH slot.

2. The method of claim 1, wherein the first PSFCH slot related to the first PSSCH resource is determined based on information related to a PSSCH-PSFCH time gap, and wherein the information related to the PSSCH-PSFCH time gap is configured for each resource pool.

3. The method of claim 1, further comprising:

performing SL reception from the second device, based on the second PSSCH resource not included in the at least one PSSCH resource, wherein transmission of SL hybrid automatic repeat request (HARQ) feedback on the second PSFCH slot and reception of SL HARQ feedback on the first PSFCH slot are not overlapped.

4. The method of claim 1, further comprising:

performing SL reception based on a third PSSCH resource;

determining a third PSFCH slot related to the third PSSCH resource; and selecting the first PSSCH resource not related to the third PSFCH slot, wherein the first PSFCH slot related to the first PSSCH resource is different from a third PSFCH slot related to the third PSSCH resource.

5. The method of claim 2, wherein the PSSCH-PSFCH time gap is determined, based on service requirements including priority, delay or quality of service (QoS) parameters.

6. A first apparatus configured to perform wireless communication, the first apparatus comprising:

at least one transceiver;

at least one processor; and at least one memory connected to the at least one processor and storing instructions that, based on being executed, cause the at least one processor to perform operations comprising:

triggering a resource selection;

determining a selection window, based on a resource selection being triggered;

selecting a first physical sidelink shared channel (PSSCH) resource within the selection window;

determining (i) a first physical sidelink feedback channel (PSFCH) slot related to the first PSSCH resource and (ii) at least one PSSCH resource related to the first PSFCH slot;

performing sidelink (SL) transmission, based on the first PSSCH resource; and transmitting, to a second device, assistance information related to the at least one PSSCH resource not preferred by the first apparatus, wherein a second PSSCH resource selected by the second device is not included in the at least one PSSCH resource, and wherein a second PSFCH slot related to the second PSSCH resource is different from the first PSFCH slot.

7. A processing device configured to control a first apparatus to perform wireless communication, the processing device comprising:

at least one processor; and at least one memory connected to the at least one processor and storing instructions that, based on being executed, cause the at least one processor to perform operations comprising:

triggering a resource selection;

determining a selection window, based on a resource selection being triggered;

selecting a first physical sidelink shared channel (PSSCH) resource within the selection window;

determining (i) a first physical sidelink feedback channel (PSFCH) slot related to the first PSSCH resource and (ii) at least one PSSCH resource related to the first PSFCH slot;

performing sidelink (SL) transmission, based on the first PSSCH resource; and transmitting, to a second device, assistance information related to the at least one PSSCH resource not preferred by the first apparatus, wherein a second PSSCH resource selected by the second device is not included in the at least one PSSCH resource, and wherein a second PSFCH slot related to the second PSSCH resource is different from the first PSFCH slot.

* * * * *